United States Patent [19]

Beagley

[11] Patent Number: 5,108,122
[45] Date of Patent: Apr. 28, 1992

[54] EXHIBITOR TRAILER

[76] Inventor: Lawrence M. Beagley, 3049 Walnut Ave., Grand Junction, Colo. 81504

[21] Appl. No.: 565,254

[22] Filed: Aug. 8, 1990

[51] Int. Cl.⁵ ............................................. B60P 3/025
[52] U.S. Cl. ..................................... 280/475; 296/21; 296/22; 296/24.1
[58] Field of Search .................... 296/21, 22, 24.1, 13, 296/14, 37.6; 280/475, 656

[56] References Cited

U.S. PATENT DOCUMENTS

| | | | |
|---|---|---|---|
| D. 163,351 | 5/1951 | Bartholomew | 296/22 |
| 1,617,940 | 2/1927 | Chase | 296/21 |
| 2,413,164 | 12/1946 | Boldt et al. | 296/22 |
| 2,845,780 | 8/1958 | Conklin et al. | 296/22 |
| 3,492,042 | 1/1970 | Nachtigall | 296/24.1 |
| 3,734,540 | 5/1973 | Thiermann | 299/24.1 |
| 3,841,663 | 10/1974 | Proffit | 280/475 |
| 4,055,206 | 10/1977 | Griffin | 296/24.1 |
| 4,060,259 | 11/1977 | Mefferd et al. | 280/656 |
| 4,705,315 | 11/1987 | Cherry | 296/37.6 |
| 4,969,678 | 11/1990 | Loisel | 296/24.1 |

FOREIGN PATENT DOCUMENTS

| | | | |
|---|---|---|---|
| 3243730 | 5/1984 | Fed. Rep. of Germany | 296/21 |
| 0810503 | 3/1937 | France | 296/21 |
| 1336319 | 7/1963 | France | 296/22 |

Primary Examiner—Charles A. Marmor
Assistant Examiner—Anne Marie Boehler
Attorney, Agent, or Firm—Donald W. Erickson

[57] ABSTRACT

An exhibitor trailer for the convenient displaying of goods, wares and services at exhibits and trade shows. The trailer overcomes the laborious task of having to unload the goods to be exhibited, setting up the goods for display and then reloading. The trailer includes a top panel which is retractable into a vertically disposed position to serve as a display panel. One side panel of the trailer is hinged at about midpoint so that a retractable display counter can project out from the side of the trailer for ease of viewing. In each corner of the trailer there is provided a vertically adjustable caster wheel to provide easy maneuverability and leveling of the trailer.

3 Claims, 5 Drawing Sheets

EXHIBITOR TRAILER

BACKGROUND OF THE INVENTION

Exhibitors at trade shows and the like have the time-consuming and laborious task of unloading their goods, oftentimes outside of the exhibit hall, transporting the goods to their assigned booth, setting up their display and then reversing the procedure when the show ends. There exists a need for a trailer which is easily transportable, convenient to use, maneuverable into a small space such as 10' by 10', capable of carrying and displaying the goods to be exhibited, and capable of being secured to prevent theft when the exhibitor is not present. The present invention fulfills the foregoing need.

SUMMARY OF THE INVENTION

The present invention provides a trailer which is particularly useful for exhibitors. The top of the trailer retracts to the side and then pivots to a vertical position to provide a display panel that runs the length of the trailer. One side panel of the trailer is hinged, at about midpoint or lower so that the upper part thereof can be let down. A slidably mounted and retractable display counter can be moved into the space made available when the hinged side panel is lowered. The display counter projects out from the outer side of the trailer so that the goods displayed therein can be easily and conveniently viewed by the exhibit attendees. In the same side panel, adjacent to the display counter and near the rear end of the trailer, is provided a door to allow ingress and egress to and from the trailer interior. Near each corner of the body of the trailer is positioned a vertically adjustable caster wheel. The caster wheels permit easy maneuverability of and leveling of the trailer. The caster wheels can be adjusted vertically sufficient for the trailer wheels to clear the floor surface. The trailer can then be moved by the exhibitor directly sideways in order to fit it into his booth space. The trailer tongue is removable in order to accommodate the small space characteristic of exhibit booths.

DETAILED DESCRIPTION OF THE INVENTION

Figure 1:
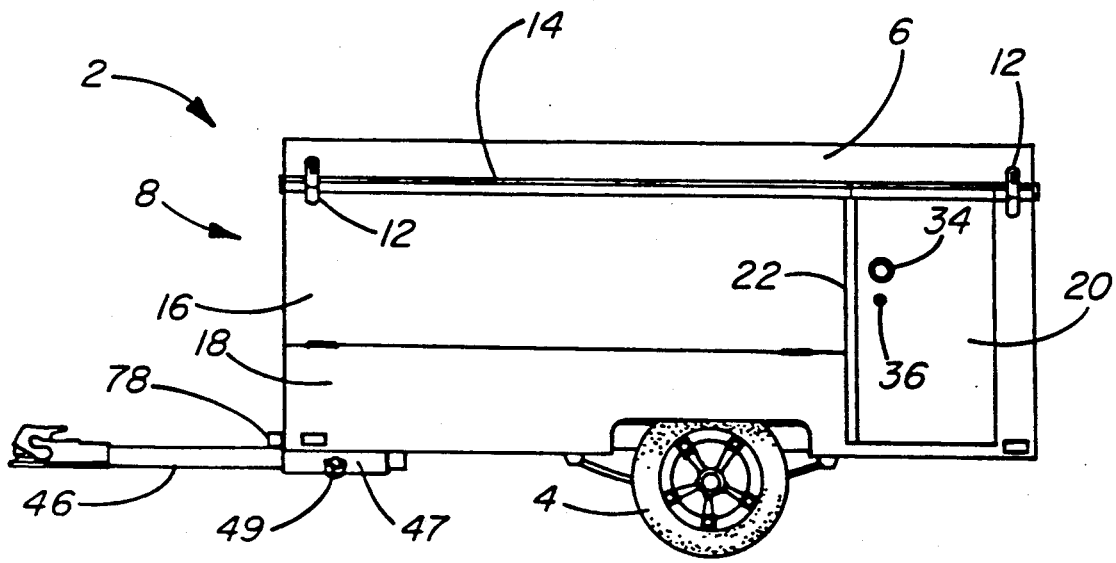
FIG. 1 is a side elevational view of an exhibitor trailer of the present invention with the trailer in closed position and ready for towing.

Referring to FIG. 1, there is shown a side elevational view of an exhibitor trailer 2 of the present invention. The trailer is in the closed position and ready for hitching and towing. The trailer is supported by a pair of pneumatic tires 4 which are positioned somewhat to the rear of midpoint for proper weight distribution. The trailer comprises a top panel 6 which is releasably but securely attached to the side panels 8 and 10 by hold down latches 12. The top panel completely covers the trailer walls and makes the interior of the trailer secure form inclement weather. The top can be secured from the opening by undesired third parties by use of one or more padlocks in conjunction with the latches 12. The top, around the border thereof, is provided with a resilient rubber or plastic seal bead 14 to protect the interior of the trailer from moisture and dust. The side panel or wall 8 is comprised of an upper hinged panel 16, a lower fixed panel 18 and a door 20. Panels 16 and 18 are separated from the door 20 by an upright rigid post 22 which is securely attached at its base to the underframe and the side of fixed panel 18 as by welding or bolting.

Figure 2:
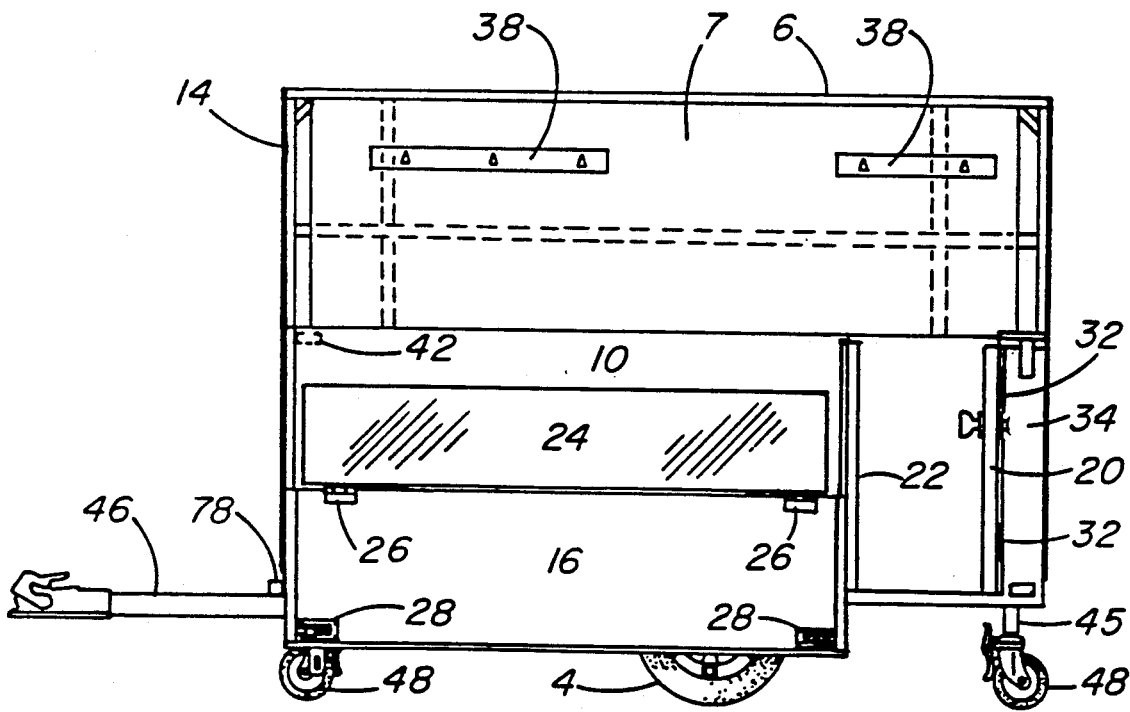
FIG. 2 is a side elevational view of the trailer of FIG. 1 in open position.
Figure 3:
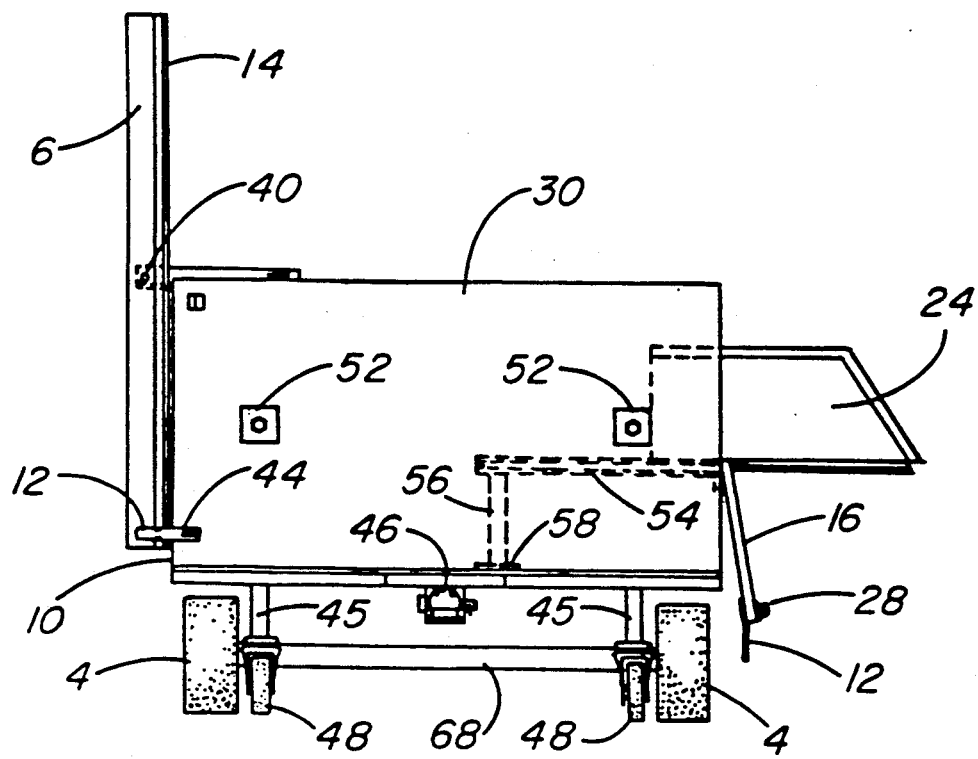
FIG. 3 is a front elevational view of the trailer of FIG. 2.

Referring to FIGS. 2 and 3, the trailer is shown in open position with the hinged panel 16 lowered and the door 20 open. In the open space provided by lowering panel 16, there is positioned a slidable and retractable display case 24 which, as best seen in FIG. 3, projects out from the side 8 for ease of viewing by the exhibit attendees. Panel 16 is hinged by using internally mounted hinges 26 or similar means. When panel 16 is in the closed position, it is secured shut by bolt locks 28 in cooperation with bolt receiving holes in post 22 and the inner side of the trailer's front panel 30. Similarly, the door 20 is hinged internally by door hinges 32. The door is provided with a conventional door handle/latch mechanism 34 and key cylinder lock 36 which engage receptors in post 22 when it is desired to close and/or lock the door such as at night or when the exhibitor is temporarily away. The door handle is preferably recessed into the door so that it is flush with the outer surface of side panel 8.

Figure 4:
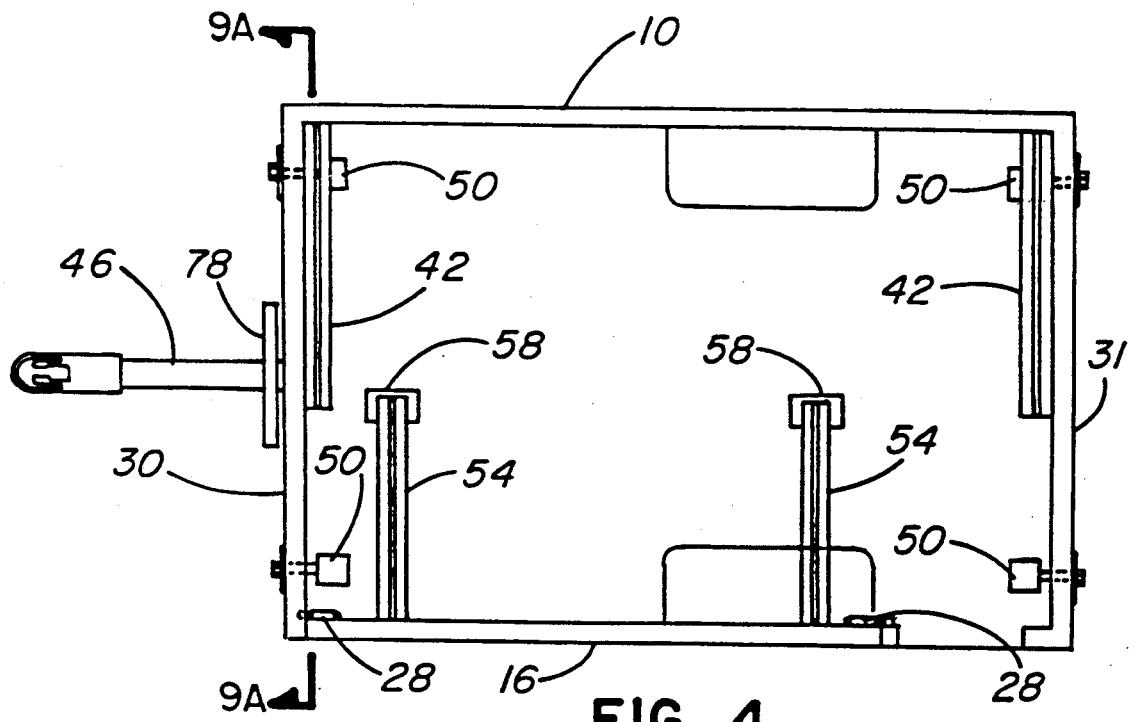
FIG. 4 is a top view of the trailer of FIG. 1 with the top panel and display counter removed.
Figure 5:
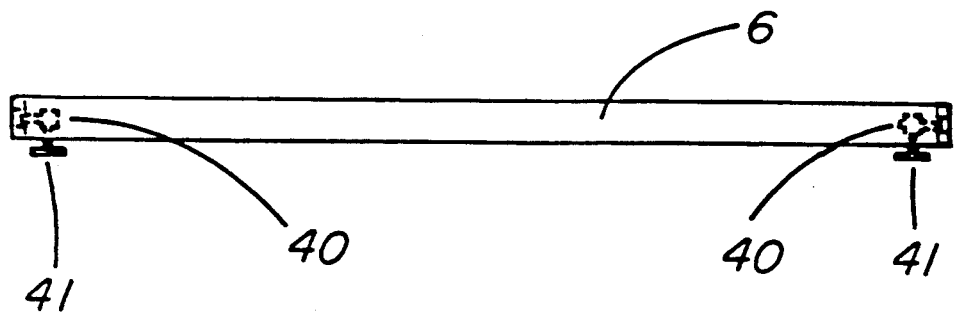
FIG. 5 is a side view of the top panel only of the trailer.
Figure 6:
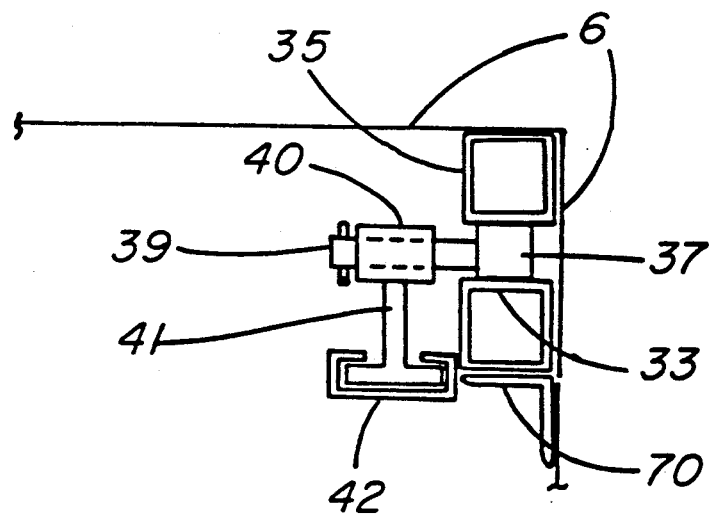
FIG. 6 is an enlarged, cross-sectional view of the means for retracting the top panel.

As mentioned, the top panel 6 is retractable so that it can be vertically disposed to serve as a display panel as best seen in FIGS. 2 and 3. Brackets 38 or other means such as shelves or cases can be attached to the inner surface of the top panel to assist in displaying the goods. It can also be used for projecting slides, an overhead projector or movies. Securely mounted, such as by welding to the iron framework of the top panel, are iron brackets 40 having an inverted generally T-shaped head 41 which cooperatively mates in sliding engagement with generally U-shaped channel members 42 which are bolted or welded to the angle iron framework of front and rear panels 30 and 31. The foregoing means for retracting top panel 6 is best seen in FIGS. 4–6. Because of the inverted T-shape of the bracket 40 in cooperation with the bevelled U-shaped channel 42, it is impossible for the top panel to disengage inadvertently. To ensure that the top panel does not close accidentally with the trailer is in the open position, latch 12 can be secured to, for example, a U-bolt 44 mounted in the lower left corner of the front panel 30 (FIG. 3) and likewise in the rear panel 31 of the trailer. As best seen in FIG. 6, bracket 40 is pivotally but securely engaged with bolt 39 which is connected, as by welding, for example, to intermediate iron frame member 37 which joins upper iron frame member 35 and lower or inner iron frame member 33, as by welding or bolting.

Figure 7:
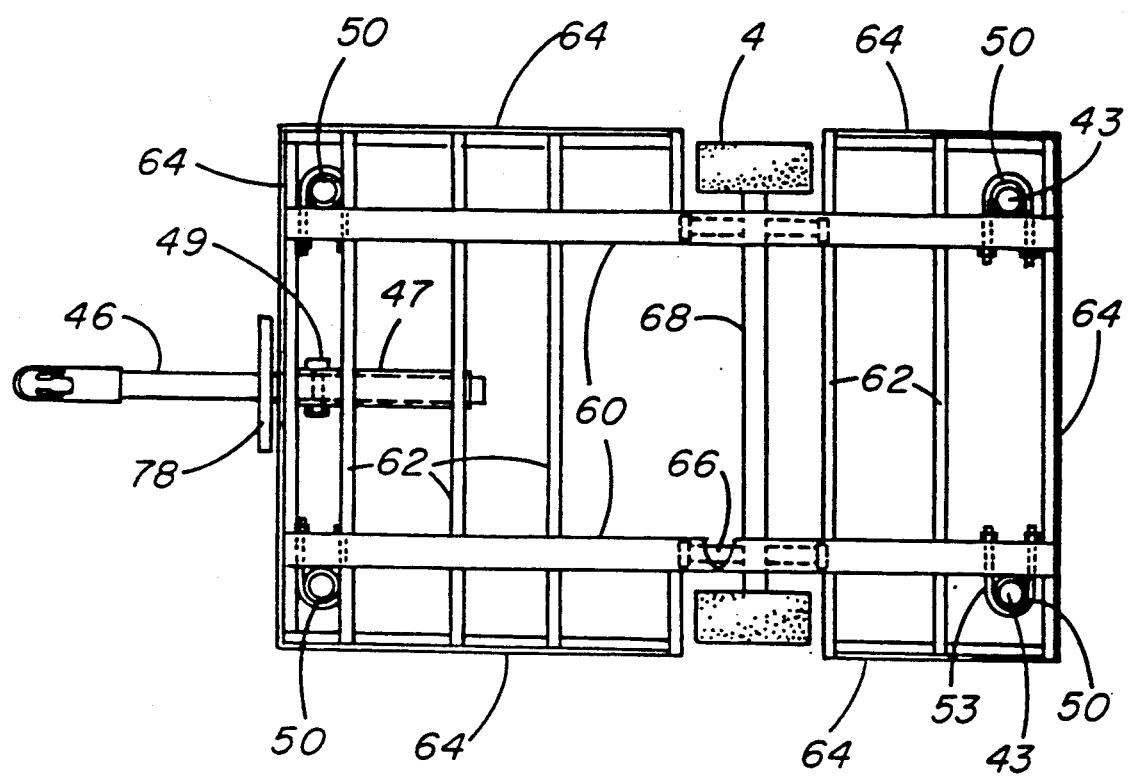
FIG. 7 is a top plan view of the underframe of the trailer.

To provide for ease of maneuverability and to insure that the trailer can be fitted into the booth space allotted, which is oftentimes only 10' by 10', the trailer is equipped with a removable tongue 46 and four caster wheels 48. As best seen in FIG. 7, the tongue 46 is telescoped into square channel iron member 47 and securely connected thereto by a 1' bolt 49. By removing bolt 49, the tongue is easily disengaged and then stored until it is desired to hitch up and tow the trailer. Referring to FIGS. 2-4 and 7, the caster wheels are individually, vertically adjustable by use of screw jacks 50 positioned near each corner of the floor of the trailer. The internally positioned jacks are actuated using a crank handle or a wrench to turn hexagonal bolts 52 located in the front and rear panel of the trailer. Once the trailer is in the exhibit hall, each caster wheel can be vertically adjusted until the tires of the trailer are clear of the floor and the trailer is entirely supported by the caster wheels. Then, the trailer is easily maneuvered to go forward, back, or sideways in order to fit the trailer into the booth space. The adjustable caster wheels are useful also to level the trailer should the exhibit hall floor not be level, in order to stabilize the trailer. When the exhibit is over, the trailer is pushed out of the booth space, the caster wheels are raised until the tires 4 contact the floor surface and take the weight of the trailer, the caster wheels are removed by pushing downward and the tongue is re-installed for hitching and towing.

The base of each jack 50 is securely attached to the underframe of the trailer using U-bolts 52 which extend through frame member 60 as shown in FIG. 7. The stem member 45 of each caster wheel is frictionally engaged in a socket or opening 43 which is in communication with the drive screw of the jack. Suitable jacks for the trailer of the present invention are the screw jacks made by Atwood Mobile Products, Rockford, Ill.

Referring to FIG. 7, there is shown the underframe of the trailer of the present invention. It is comprises of main frame members 60 of square channel iron and cross frame members 62 which are welded to and flush with the upper surface of members 60. The peripheral frame members 64 are angle iron and welded to frame members 60 and 62. Leaf springs 66 shown in broken lines are bolted to members 60 and axle 68. The trailer tongue is provided with a towing equalizer 78 to improve stability during towing.

Figure 8:
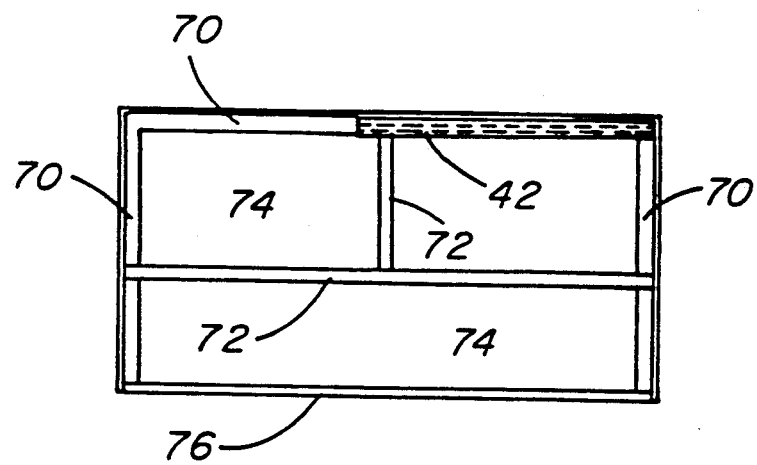
FIG. 8 is an elevational view along line 9A—9A of FIG. 4.

Framing for the trailer walls is typified by the framing shown in FIG. 8 which is a view of the inner surface of the front wall 30. The frame comprises peripheral angle iron members 70 and channel iron members 72. The base of members 70 is welded to the underframe shown in FIG. 7. The front wall, as typical of the other walls, has a covering of ¼" plywood 74 attached to the frame members as by bolting. The plywood is, in turn, covered with baked anamel aluminum sheeting by riveting it to the plywood. For the floor 76, there is used ⅜" plywood which is bolted to the underframe. As can be best seen in FIG. 8, U-shaped channel member 42 slopes downwardly toward its inner end. The purpose of the slope is to accommodate bracket 40 and member 41 and provide space therefor so that the top panel when in the closed position can lie flat. Member 42 is connected to top angle iron member 70 as by bolting or welding. In the embodiment shown, the slope of member 42 from the outer to inner end is about ⅜".

Figure 9:
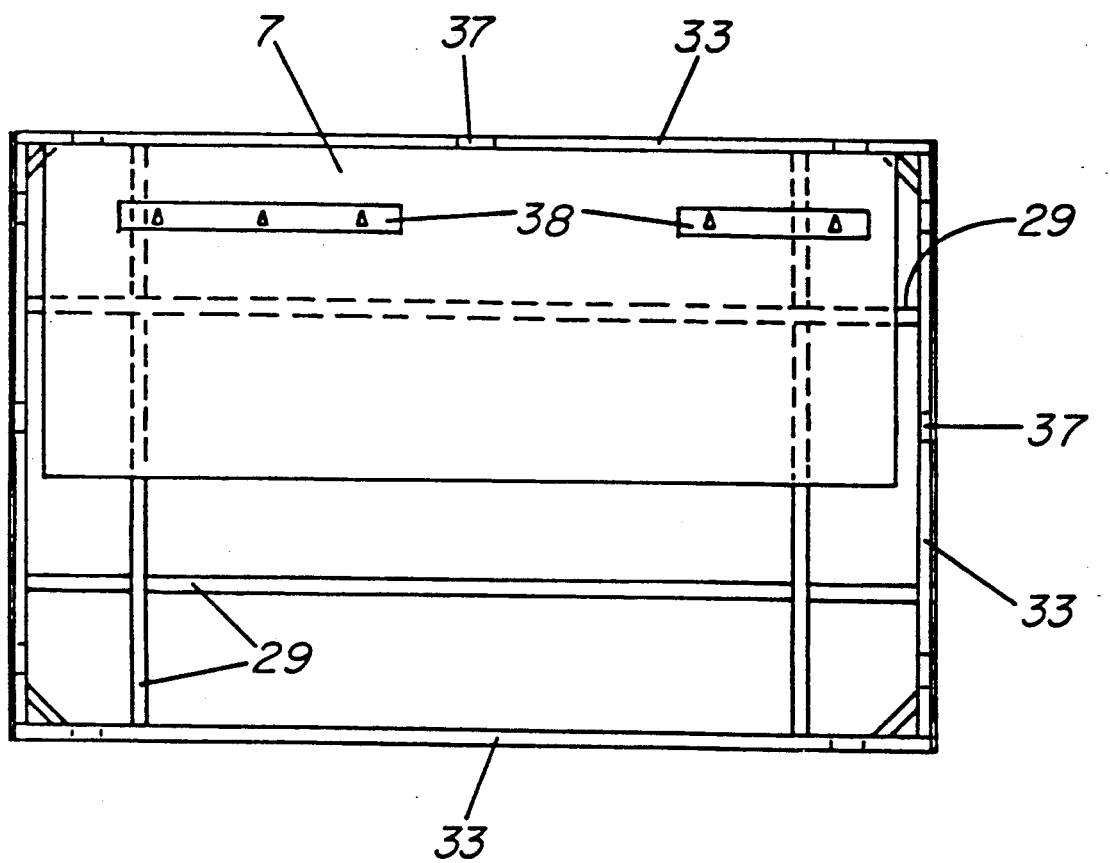
FIG. 9 is an elevational view of the inner side of the top panel.

Referring to FIG. 9, there is shown an inside plan view of the lower or inner framework and display panel 7 of the top panel 6. The framework comprises peripheral square iron channel members 33 and iron cross members 29 which are welded together. Frame members 33 are welded to intermediate members 37 which in turn are welded to upper frame member 35. Display panel 7, which is ¼ to ½ inch plywood, is bolted to frame members 29. The display panel covers about ½ of the inner surface of the top panel. As with the wall structure, the outer surface of the top panel can be about ¼" plywood to which is fastened baked enamel aluminum sheeting.

The display case 24 has the noteworthy advantage that the exhibitor can fully arrange the display of goods therein prior to arriving at the exhibit hall and then within minutes of arriving at the exhibit hall have the display case in position for convenient viewing by fellow exhibitors and attendees. As shown in FIG. 1-4, the display case is slidably movable so that it can be retracted into the interior of the trailer, as in FIG. 1, or projects out from the side of the trailer, as in FIGS. 2 and 3, for convenient viewing of the displays therein and/or thereon. The display case is slidably mounted using the same type of means as described for the top panel. Thus, a bracket like bracket 40 is bolted to the underside of the case and it is engaged with U-shaped channel member 54, one at each side, which are supported at the inner end by iron posts 56 and bolted or welded at the outer end to the iron framework of fixed side panel 18. The posts 56 are welded to base plate members 58 which are in turn bolted to the floor of the trailer. The display case, as shown, is made of plywood and the top and front surfaces covered with glass. The case can be made of other materials such as from a plastic, e.g., "Plexiglass" or "Lucite", and also be made in other shapes or forms.

In the specific embodiment described herein, the trailer body has overall dimensions of about 9½' length, 6½' and 4' height, which is convenient for use in exhibit spaces measuring 10'×10' and larger. Depending upon the exhibitor's needs, the trailer body can be made smaller or larger.

Relative to materials, the use of plywood and aluminum sheeting can be replaced, in part of in whole, by such materials as plastic, e.g., fiberglass, ABS, and the like, or metals such as aluminum, steel and alloys. In addition, the framework members and retraction means can be made of metals other than iron such as cast aluminum and alloys thereof.

While the exhibitor trailer of the present invention was specifically designed for use by an outfitter, it is versatile and can be used by exhibitors of other things such as arts, crafts, jewelry, knives, binoculars, and the like.

What is claimed is:

1. An exhibitor trailer which comprises:
    a generally rectangular underframe having parallel side frame members and parallel front and rear members, a towing tongue connected to the front member of the underframe;
    a generally rectangular body adapted for attachment to the underframe, said body including a floor, front and rear end walls, a first sidewall and a second sidewall joining together the end walls, a retractable top panel adapted to cover the end walls and sidewalls and framework adapted to support said end walls, sidewalls and top panel;
    the first sidewall having an upper hinged panel, a lower fixed panel and a door to allow ingress and egress to and from the interior of said body;
    means for retracting the top panel so that it can be vertically disposed along the second sidewall to serve as a display panel;

a retractable display counter adjacent to the first sidewall;

means for retracting the display counter so that it is completely inside of said body when said hinged panel is in the closed position and said counter projects outward from the first sidewall when said hinged panel is lowered; and a vertically adjustable caster wheel positioned near each corner of and connected to the underframe to provide for easy maneuverability of and leveling of the trailer.

2. The trailer according to claim 1 wherein the tongue is detachably connected.

3. The trailer according to claim 2 including means for locking the trailer.

* * * * *